(12) United States Patent
Nahvi

(10) Patent No.: US 11,809,358 B2
(45) Date of Patent: Nov. 7, 2023

(54) USB DEVICE REMOVAL AND PING INTERVENTION IN AN EXTENSION ENVIRONMENT

(71) Applicant: Icron Technologies Corporation, Burnaby (CA)

(72) Inventor: Mohsen Nahvi, North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 17/512,333

(22) Filed: Oct. 27, 2021

(65) Prior Publication Data

US 2022/0138137 A1    May 5, 2022

Related U.S. Application Data

(60) Provisional application No. 63/108,149, filed on Oct. 30, 2020.

(51) Int. Cl.
| | | |
|---|---|---|
| *G06F 13/40* | (2006.01) | |
| *G06F 13/42* | (2006.01) | |
| *H04L 43/10* | (2022.01) | |

(52) U.S. Cl.
CPC ...... *G06F 13/4045* (2013.01); *G06F 13/4282* (2013.01); *H04L 43/10* (2013.01); *G06F 2213/0042* (2013.01)

(58) Field of Classification Search
CPC ..... G06F 13/4282; G06F 13/32; G06F 13/387
See application file for complete search history.

(56) References Cited

U.S. PATENT DOCUMENTS

| | | | | |
|---|---|---|---|---|
| 6,381,666 | B1* | 4/2002 | Kejser | G06F 13/4045 710/316 |
| 2004/0177197 | A1* | 9/2004 | McLeod | G06F 13/4045 710/300 |
| 2005/0071733 | A1* | 3/2005 | Fukae | G06F 13/426 714/776 |
| 2007/0118674 | A1* | 5/2007 | Ulenas | G06F 13/4045 710/316 |
| 2007/0174526 | A1* | 7/2007 | Blackwell | G06F 13/12 710/73 |
| 2012/0117278 | A1* | 5/2012 | Salamon | H04L 12/2832 710/16 |

(Continued)

*Primary Examiner* — Henry Tsai
*Assistant Examiner* — Harry Z Wang
(74) *Attorney, Agent, or Firm* — CHRISTENSEN O'CONNOR JOHNSON KINDNESS PLLC

(57) ABSTRACT

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to at least one USB device via a USB-compliant connection and communicatively coupled to the UFP device via a non-USB extension medium. The DFP device is configured to receive, from the UFP device, an incoming request packet addressed to a first USB endpoint provided by a USB device; and hold transmission of an outgoing request packet based on the incoming request packet to the USB device in response to determining that a ping response packet has not yet been received from the first USB endpoint.

17 Claims, 8 Drawing Sheets

(56) References Cited

U.S. PATENT DOCUMENTS

2013/0132625 A1* 5/2013 Hall .................... G06F 13/4286
710/106
2017/0192922 A1* 7/2017 Li ......................... G06F 13/385
2019/0102333 A1* 4/2019 Hundal ............... G06F 13/1642

* cited by examiner

USB DEVICE REMOVAL AND PING INTERVENTION IN AN EXTENSION ENVIRONMENT

CROSS REFERENCE TO RELATED APPLICATION

This application claims the benefit of Provisional Application No. 63/108,149, filed Oct. 30, 2020, the entire disclosure of which is hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; released as Universal Serial Bus 3.1 Specification Revision 1.0 in July 2013; released as Universal Serial Bus 3.2 Specification Revision 1.0 on Sep. 22, 2017, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.1 of the USB Specifications, Super-Speed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for communicating USB information via an extension medium is provided. The system comprises an upstream facing port device (UFP device) and a downstream facing port device (DFP device). The UFP device is communicatively coupled to a host device via a USB-compliant connection. The DFP device is communicatively coupled to at least one USB device via a USB-compliant connection and communicatively coupled to the UFP device via a non-USB extension medium. The DFP device is configured to receive, from the UFP device, an incoming request packet addressed to a first USB endpoint provided by a USB device; and hold transmission of an outgoing request packet based on the incoming request packet to the USB device in response to determining that a ping response packet has not yet been received from the first USB endpoint.

In some embodiments, a method for communicating USB information via a non-USB extension medium is provided. A UFP device receives, from a host device over a USB-compliant connection, an original ping packet addressed to a first USB endpoint provided by a USB device. The UFP device transmits, to a DFP device via the non-USB extension medium, a ping packet based on the original ping packet. The UFP device transmits, to the host device, a synthetic ping response packet without having received a responsive ping packet from the DFP device.

In some embodiments, a method for communicating USB information via a non-USB extension medium is provided. A DFP device receives, from a UFP device via the non-USB extension medium, an incoming request packet addressed to a first USB endpoint provided by a USB device. The DFP device holds transmission of an outgoing request packet addressed to the first USB endpoint based on the incoming request packet in response to determining that a ping response packet has not yet been received from the first USB endpoint.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
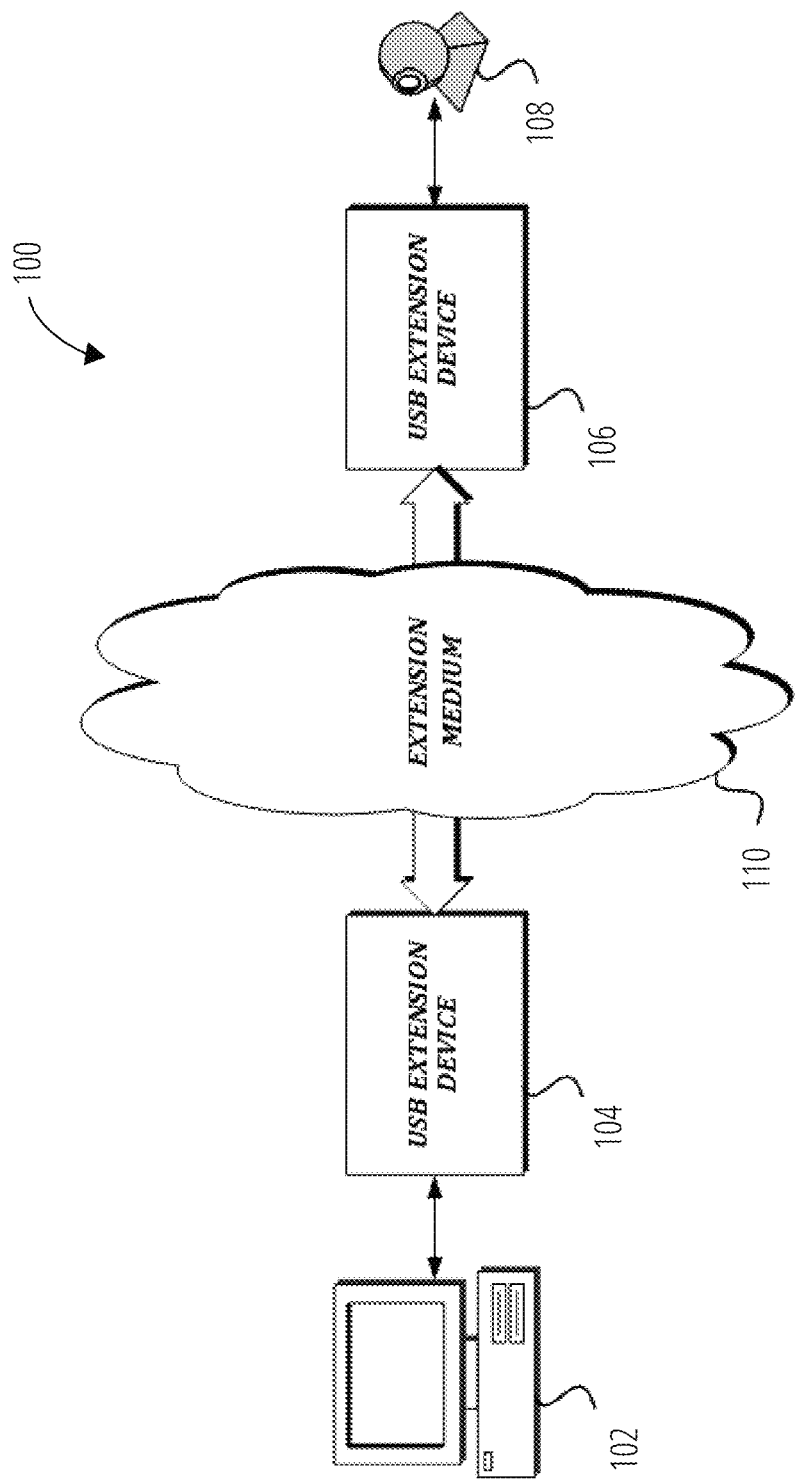
FIG. 1 is a block diagram that illustrates one embodiment of a system for extending USB communication according to various embodiments of the present disclosure

FIG. 1 is a block diagram that illustrates one embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, USB 3.0, or USB 3.1. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the upstream USB extension device 104 and the downstream USB extension device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the upstream USB extension device 104 and downstream USB extension device 106 is that they hide the presence of the extension medium 110 from the host device 102 and the USB device 108. In other words, upstream USB extension device 104 and downstream USB extension device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the upstream USB extension device 104 and downstream USB extension device 106 without any non-standard software or hardware re-configuration on the host device 102 or USB device 108.

Figure 2:
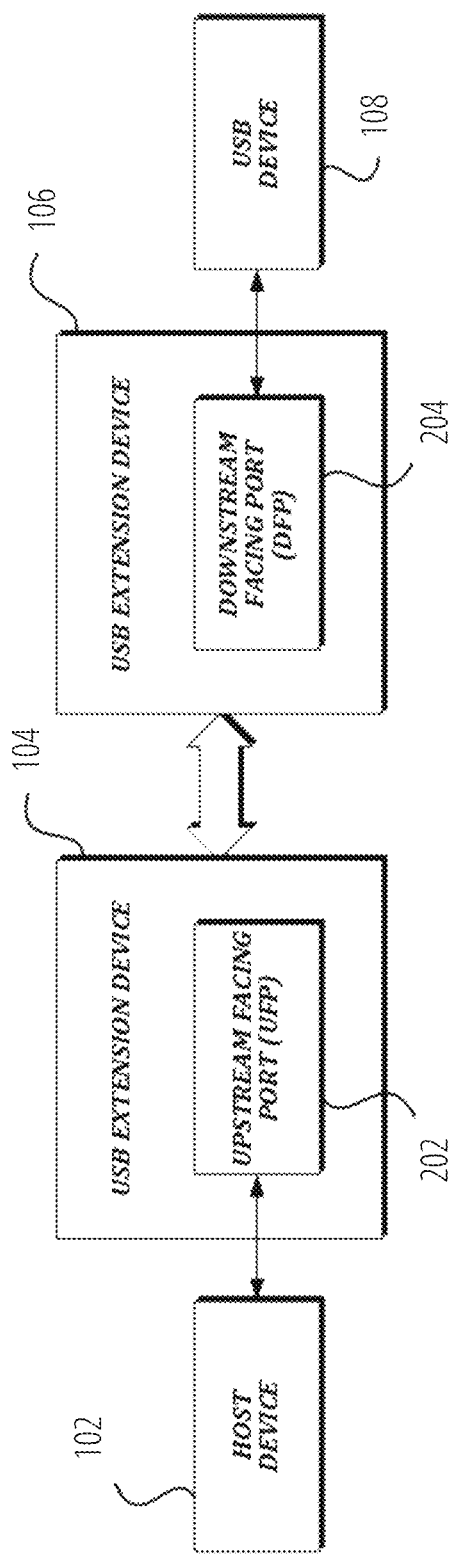
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of the host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub, and/or the like. Likewise, in other embodiments, the downstream facing port 204 of the downstream USB extension device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
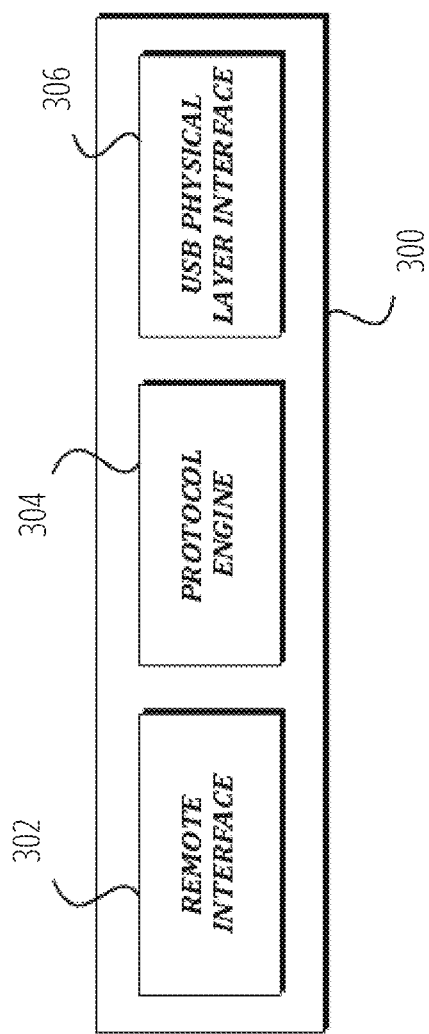
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 304, a USB physical layer interface 306, and a remote interface 302. In some embodiments, the protocol engine 304 may be configured to provide and/or execute the logic discussed below with regard to the UFP device 104 and/or the DFP device 106. The protocol engine 304 may instruct the USB physical layer interface 306 to apply the appropriate electrical signals to the USB physical layer in order to communicate with the USB device 108 or the host device 102. Likewise, the protocol engine 304 may instruct the remote interface 302 to exchange information with the remote USB extension device.

In some embodiments, the protocol engine 304 may be implemented within a logic device such as a PLD, an ASIC, a FPGA, and/or the like. In other embodiments, the protocol engine 304 may be implemented within a computing device having at least one processor and a memory containing computer-executable instructions that, if executed by the at least one processor, cause the protocol engine 304 to perform the actions discussed below; a dedicated digital hardware device implemented, for example, as a state machine configured to perform the actions described; within an application specific processor; and/or within any other suitable computing device. In some embodiments, the protocol engine 304 (or other component of the port device 300) may include a computer-readable memory usable to cache data packets, as discussed further below.

In some embodiments, logic of actions attributed to a USB extension device is executed by a protocol engine 304, which then instructs a USB physical layer interface 306 and/or a remote interface 302 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 304, a USB physical layer interface 306, a remote interface 302, and/or some other component of the USB extension device.

Figure 4:
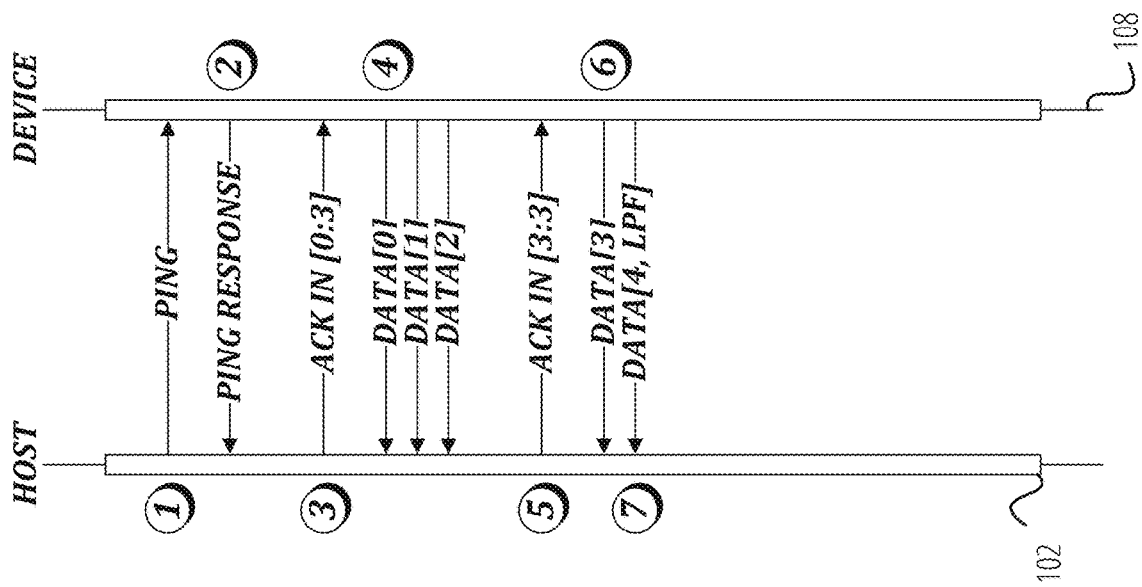
FIG. 4 is a sequence diagram that illustrates characteristics of a transaction between a host device and a USB device according to the USB Specifications.

FIG. 4 is a sequence diagram that illustrates characteristics of a transaction between a host device 102 and a USB device 108 according to the USB Specifications.

In the sequence diagram illustrated in FIG. 4 (and in the other sequence diagrams included herewith), time advances from the top of the diagram to the bottom of the diagram. Solid arrows indicate the transmission of packets generated by a host device 102 or USB device 108 according to the USB Specifications (and/or encapsulated or translated versions thereof). Though none are illustrated in FIG. 4, dashed arrows indicate the transmission of synthetic packets generated by a UFP device 104 or a DFP device 106, either based on a packet generated by a host device 102 or USB device 108, in response to a packet generated by a host device 102 or a USB device 108, or unilaterally by the UFP device 104 or the DFP device 106. The synthetic packets may be identical in content to the packets generated by a host device 102 or a USB device 108 but shifted in time, or may have content that is altered from the content of the packets generated by a host device 102 or a USB device 108. Horizontal arrows between separate elements indicate transmissions that comply with timing requirements of the USB Specifications, while angled arrows indicate transmissions over the extension medium 110 that may be affected by increased latency. The circled numbers refer to points in the sequence of data processing for discussion purposes.

At point 1 in FIG. 4, the host device 102 checks to see if the USB device 108 is active by sending a PING packet. At point 2, the USB device 108 receives the PING packet, and replies with a PING RESPONSE packet. Upon receiving the PING RESPONSE packet, the host device 102 knows that the USB device 108 is active, and so at point 3, the host device 102 transmits a request packet (an ACK IN packet) to the USB device 108 to start an isochronous IN transaction with the USB device 108. At point 4, the USB device 108 transmits DATA packets responsive to the request packet to the host device 102.

Since all of the requested data packets were received, the last data packet had a full data size, and the last data packet did not have its last packet flag (LPF) set, the host device 102 determines that more packets are available from the USB device 108. Accordingly, at point 5, the host device 102 transmits a second request packet to the USB device 108 to retrieve the next burst of data packets. At point 6, the USB device 108 begins transmitting DATA packets to the host device 102 responsive to the second request packet. At point 7, the host device 102 receives a DATA packet with the LPF set, and so it does not send a subsequent request packet.

One will recognize that FIG. 4 illustrates a non-limiting example of a very simple isochronous IN transaction between a host device 102 and a USB device 108 over a USB-compliant connection, and that in other embodiments, more or fewer packets may be transmitted, more USB-compliant devices (including but not limited to one or more hub devices) may be present between the host device 102 and the USB device 108, and other changes may be made without departing from the scope of the disclosure.

As discussed above, in embodiments of the present disclosure, USB-compliant communication between a host device 102 and a USB device 108 is extended across a non-USB-compliant extension medium via a UFP device 104 and a DFP device 106. The inventor of the present disclosure has determined that, if the PING packet and PING RESPONSE packets are required to traverse the non-USB-compliant extension medium, communication between the host device 102 and the USB device 108 may be unstable, may be unnecessarily slow, or may otherwise provide less-than-desired performance. What is needed are techniques for handling the processing of PING packets generated by the host device 102 to provide improved performance in an extension environment.

Figure 5:
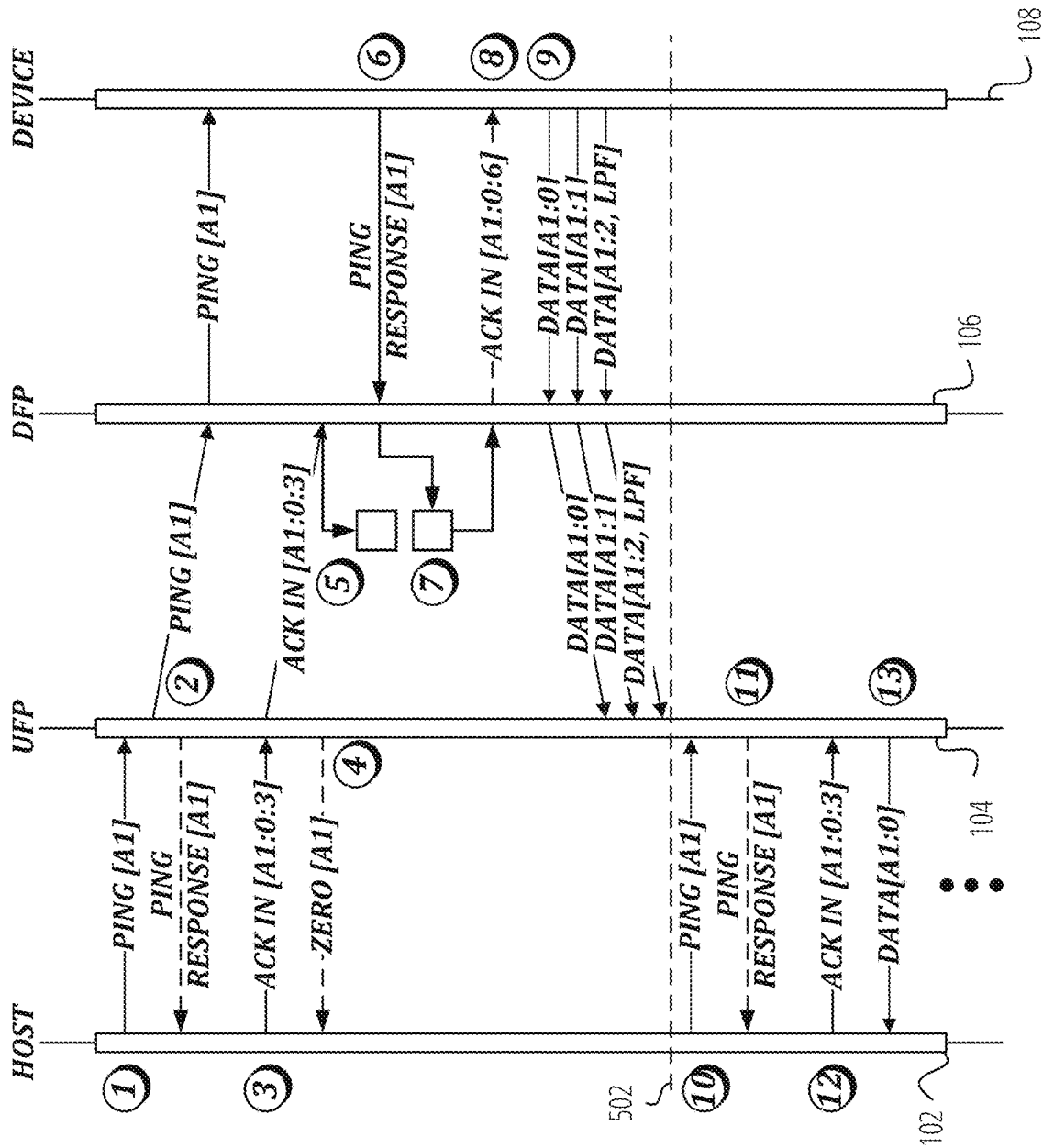
FIG. 5 is a sequence diagram that illustrates a non-limiting example embodiment of a method for processing communication between a host device and a USB device via an extension medium according to various aspects of the present disclosure.

FIG. 5 is a sequence diagram that illustrates a non-limiting example embodiment of a method for processing communication between a host device 102 and a USB device 108 via an extension medium according to various aspects of the present disclosure. In the illustrated method, the UFP device 104 processes PING packets from the host device 102 locally, and causes processing of a subsequent request packet from the host device 102 to wait until it is confirmed that a PING RESPONSE was transmitted by the USB device 108 and received by the DFP device 106.

At point 1, the host device 102 generates an original PING packet addressed to a first USB endpoint provided by the USB device 108 (endpoint A1) and transmits the original PING packet to the UFP device 104. The UFP device 104 provides a PING packet based on the original PING packet to the DFP device 106 via the extension medium 110, and the DFP device 106 transmits the PING packet to the USB device 108.

Instead of waiting for the PING packet to traverse the extension medium 110 and to be processed by the DFP device 106 and the USB device 108, at point 2 the UFP device 104 transmits a synthetic PING RESPONSE packet without having received a responsive PING packet from the USB device 108. By transmitting the synthetic PING RESPONSE packet, the UFP device 104 allows the host device 102 to continue on to transmit its request packet without waiting for the PING RESPONSE to traverse the extension medium 110. It has been found that the connection between the host device 102 and the USB device 108 is made more stable by doing so, at least because the host device 102 is configured to expect to have to wait for responses to request packets, whereas waiting for a response to a PING packet may indicate that a USB device 108 is inactive or inaccessible.

At point 3, since the host device 102 has received the synthetic PING RESPONSE packet that appears to the host device 102 to have been transmitted by the first USB endpoint, the host device 102 proceeds to transmit a request packet addressed to the first USB endpoint (such as the illustrated ACK IN packet) to the UFP device 104. At point 4, the UFP device 104 transmits a synthetic packet to the host device 102 to place the host device 102 in a waiting state. In the illustrated embodiment, the UFP device 104 transmits a synthetic zero-length DATA packet to cause the host device 102 to wait. The host device 102 will then, according to the USB Specification, wait for the next appropriate opportunity to re-transmit its request packet for the first USB endpoint. In some embodiments, the host device 102 may wait until a subsequent service interval to re-transmit the request packet, such as the illustrated service interval boundary 502.

Meanwhile, once the UFP device 104 receives the request packet from the host device 102 transmitted at point 3, the UFP device 104 transmits a request packet based on that packet to the DFP device 106. At point 5, the DFP device 106 checks whether a PING RESPONSE has yet been received from the first USB endpoint. In the illustrated embodiment, the PING RESPONSE has not been received at point 5, and so the DFP device 106 stores the incoming request packet in a packet queue local to the DFP device 106.

At point 6, the USB device 108 transmits a PING RESPONSE packet from the first USB endpoint to the DFP device 106. Upon receiving the PING RESPONSE packet, at point 7, the DFP device 106 checks the packet queue to determine whether any request packets are waiting for the first USB endpoint. The DFP device 106 finds the incoming request packet addressed to the first USB endpoint in the packet queue, and at point 8, transmits to the USB device 108 a synthetic outgoing request packet addressed to the first USB endpoint. In some embodiments, the DFP device 106 may also delete the incoming request packet from the packet queue upon the transmission of the synthetic outgoing request packet based thereon.

In the illustrated embodiment, more packets are requested by the synthetic outgoing request packet than were requested by the incoming request packet in order to cache additional data packets at the UFP device 104, though in other embodiments, the synthetic outgoing request packet may request fewer data packets or the same number of data packets compared to the incoming request packet.

At point 9, the first USB endpoint begins transmitting data packets from the USB device 108 to the DFP device 106, and the DFP device 106 retransmits the data packets to the UFP device 104 via the extension medium 110. The UFP device 104 stores the data packets in a buffer in order to service future request packets from the host device 102 in a way that compensates for the latency introduced by the extension medium 110.

At point 10, the host device 102 transmits another PING packet addressed to the first USB endpoint, and at point 11, the UFP device 104 transmits another synthetic PING RESPONSE packet, as at points 1 and 2. At point 12, the host device 102 transmits a request packet to the UFP device 104 addressed to the first USB endpoint as at point 3. At point 11, the UFP device 104 begins transmitting the data packets stored in its buffer to the host device 102. The method then continues to complete the transmission of the buffered data packets from the UFP device 104 to the host device 102.

In the description above, the terms "original," "incoming," and "outgoing" are applied to various packets for the purpose of disambiguation only, and should not be seen as limiting.

Figure 6:
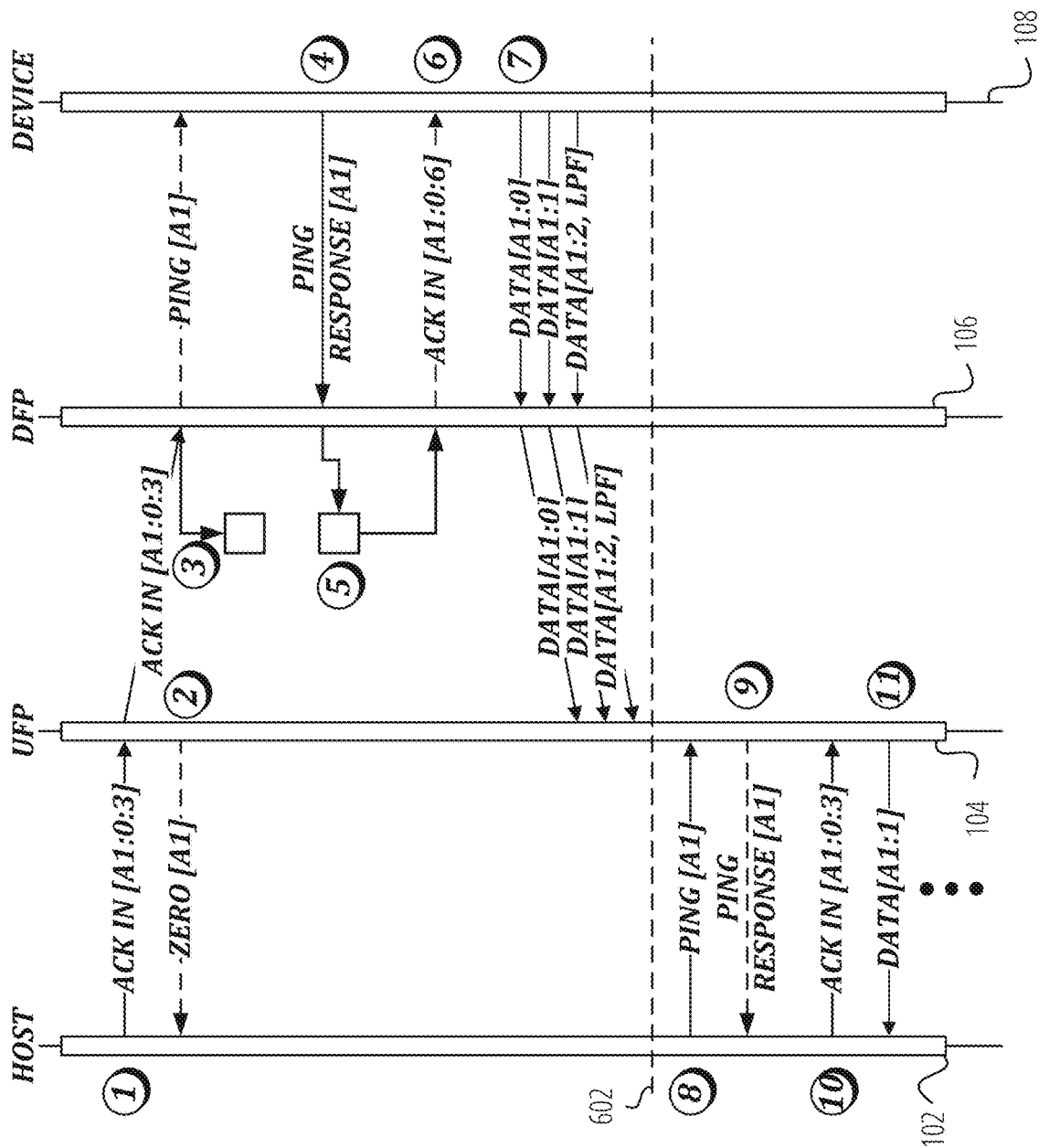
FIG. 6 is a sequence diagram that illustrates another non-limiting example embodiment of a method for processing communication between a host device and a USB device via an extension medium according to various aspects of the present disclosure.

FIG. 6 is a sequence diagram that illustrates another non-limiting example embodiment of a method for processing communication between a host device 102 and a USB device 108 via an extension medium according to various aspects of the present disclosure. For some host devices 102, a preliminary PING packet is not transmitted to a USB device 108 before transmitting a request packet. FIG. 6 uses techniques similar to those illustrated in FIG. 5, but that compensate for host devices 102 that fail to send the preliminary PING packet.

At point 1, the host device 102 generates a request packet addressed to the first USB endpoint (such as the illustrated ACK IN packet) and transmits it to the UFP device 104. At point 2, the UFP device 104 transmits a synthetic packet to the host device 102 to place the host device 102 in a waiting state. In the illustrated embodiment, the UFP device 104 transmits a synthetic zero-length DATA packet to cause the host device 102 to wait. The host device 102 will then, according to the USB Specification, wait for the next appropriate opportunity to re-transmit its request packet for the first USB endpoint. In some embodiments, the host device 102 may wait until a subsequent service interval to re-transmit the request packet, such as the illustrated service interval boundary 602. One will note that these actions are similar to those discussed above from point 3 to point 4 of FIG. 5.

Meanwhile, once the UFP device 104 receives the request packet transmitted by the host device 102 at point 1, the UFP device 104 transmits a request packet based on that packet to the DFP device 106. At point 3, the DFP device 106 checks whether a PING RESPONSE has yet been received from the first USB endpoint. In the illustrated embodiment, the PING RESPONSE has not been received at point 3, and so the DFP device 106 stores the incoming request packet in a packet queue local to the DFP device 106. The DFP device 106 also detects that a PING packet has not been transmitted to the first USB endpoint, and so the DFP device 106 generates a synthetic PING packet and transmits it to the first USB endpoint.

At point 4, the USB device 108 transmits a PING RESPONSE packet from the first USB endpoint to the DFP device 106. From this point on, the actions illustrated in FIG. 6 are similar to the actions illustrated in FIG. 5 from point 6 on, and so are not described again here for the sake of brevity. As shown, the host device 102 transmits a PING packet at point 8, which is processed similarly to the PING packet transmitted at point 10 of FIG. 5. In some embodiments, instead of sending the PING packet after the service interval boundary 602, the host device 102 may proceed directly to point 10 and may transmit the request packet without sending the PING packet as illustrated at POINT 1.

The generation of synthetic PING RESPONSE packets by the UFP device 104 without waiting to receive an actual PING RESPONSE packet from a target USB endpoint improves the connection between a host device 102 and a USB device 108, but it also introduces additional issues. In particular, the synthetic PING RESPONSE puts the host device 102 in a state where it believes that the USB device 108 is connected and available, even if the USB device 108 is actually unavailable or has been disconnected. This can cause the host device 102 to repeatedly try to request data from a USB device 108 that will never respond.

Figure 7:
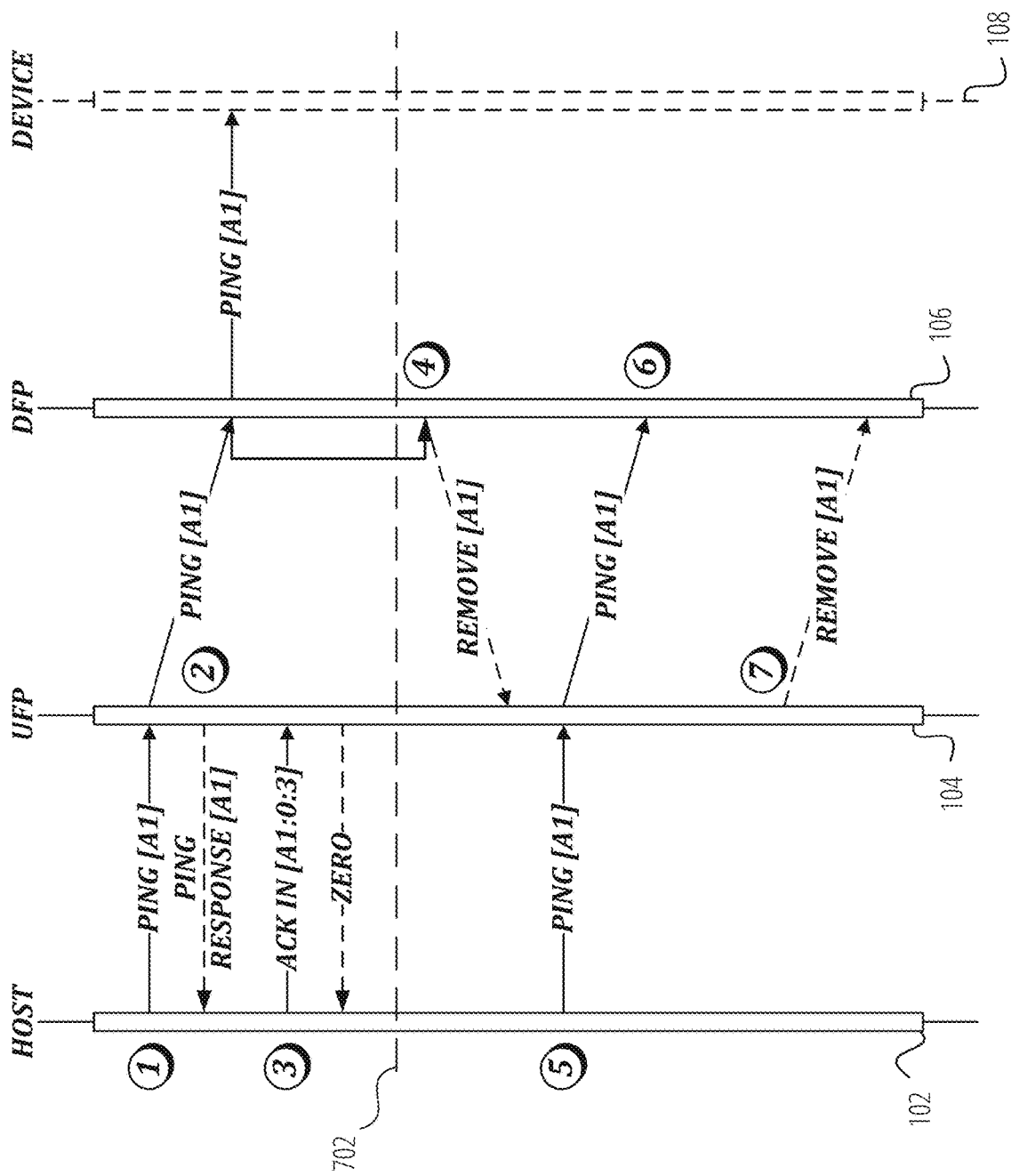
FIG. 7 is a sequence diagram that illustrates a non-limiting example embodiment of a method of processing USB PING packets in an extension environment in which a target USB device has been disconnected, according to various aspects of the present disclosure.

FIG. 7 is a sequence diagram that illustrates a non-limiting example embodiment of a method of processing USB PING packets in an extension environment in which a target USB device 108 has been disconnected, according to various aspects of the present disclosure. In FIG. 7, the USB device 108 is illustrated in dashed line because communication between the DFP device 106 and the USB device 108 fails, either because the USB device 108 has become unresponsive, because the USB device 108 has been disconnected, or for any other reason.

At point 1, the host device 102 generates an original PING packet addressed to a first USB endpoint provided by the USB device 108 (endpoint A1) and transmits the original PING packet to the UFP device 104. Instead of waiting for the PING packet to traverse the extension medium 110 and to be processed by the DFP device 106 and the USB device 108, at point 2 the UFP device 104 transmits a synthetic PING RESPONSE packet without having received a responsive PING packet from the USB device 108. At point 3, since the host device 102 has received the synthetic PING RESPONSE packet that appears to the host device 102 to have been transmitted by the first USB endpoint, the host device 102 proceeds to transmit a request packet addressed to the first USB endpoint (such as the illustrated ACK IN packet) to the UFP device 104, and the UFP device 104 transmits a synthetic packet to the host device 102 to place the host device 102 in a waiting state.

The communication between the host device 102 and the UFP device 104 between points 1-3 is similar to the communication between the host device 102 and the UFP device 104 between points 1-4 in FIG. 5, and so is not described in detail again here for the sake of brevity. One will note that at point 3, the UFP device 104 may transmit a request packet to the DFP device 106 based on the request packet received from the host device 102, and the DFP device 106 may store the request packet to wait for a PING RESPONSE packet from the USB device 108. Since this functionality is also illustrated and described in FIG. 5, it is not again illustrated or described here in order to avoid obscuring the processing of the failed PING.

Returning to point 1, upon receiving the original PING packet from the host device 102, the UFP device 104 transmits the original PING packet to the DFP device 106, and the DFP device 106 transmits the original PING packet on the USB bus. If the USB device 108 were active and connected to the USB bus, it should respond to the original PING packet with a PING RESPONSE packet as illustrated at point 6 of FIG. 5. However, since the USB device 108 in FIG. 7 is disconnected or otherwise unresponsive, no PING RESPONSE packet is generated. Accordingly, the DFP device 106 waits to receive the PING RESPONSE packet until the occurrence of a service interval boundary 702. As illustrated, the service interval boundary 702 occurs at the same time across the connection between the host device 102 and the UFP device 104, as well as across the connection between the DFP device 106 and the USB device 108. This is illustrated this way for the sake of convenience, and in some embodiments, the service interval boundaries may occur at unsynchronized times across these two different connections. For purposes of the present disclosure, the precise timing of the service interval boundary between the host device 102/UFP device 104 compared to the service interval boundary between the DFP device 106/USB device 108 is not as important as the fact that the DFP device 106 waits for the PING RESPONSE packet until the service interval boundary 702 occurs.

Once the DFP device 106 determines that the PING RESPONSE packet had not been received from the first USB endpoint before the occurrence of the service interval boundary 702, at point 4, the DFP device 106 transmits a notification to the UFP device 104 that the first USB endpoint is unresponsive. In some embodiments, the DFP device 106 may wait longer than a single service interval before transmitting the notification. For example, in some embodiments, the DFP device 106 may wait for three service interval boundaries to pass before transmitting the notification. Waiting three service interval boundaries has been found by the inventor to be long enough to avoid causing jittery behavior in the extension environment, while being short enough to avoid causing issues with downstream USB hubs. In some embodiments, other numbers of service interval boundaries may be used as a waiting period before transmitting the notification.

In some embodiments, the notification transmitted to the UFP device 104 is a command to remove the first USB endpoint from a list of active endpoints stored by the UFP device 104, or to otherwise indicate in an endpoint table stored by the UFP device 104 that the first USB endpoint did not respond to the PING packet. In some embodiments, the DFP device 106 does not remove the first USB endpoint from its own endpoint table, but does note that the first USB endpoint did not respond to the PING packet.

In some embodiments, a host device 102 may send a PING packet to an endpoint in any service interval during which it intends to request packets from the endpoint in order to ensure that the endpoint is ready. Accordingly, at point 5, the host device 102, as allowed by the USB Specifications, creates a subsequent PING packet addressed to the first USB endpoint and transmits it to the UFP device 104. The UFP device 104 retransmits the subsequent PING packet to the DFP device 106.

At point 6, the DFP device 106 receives the subsequent PING packet, and because the endpoint table of the DFP device 106 indicates that the first USB endpoint did not respond to the original PING packet, the DFP device 106 simply discards the subsequent PING packet. In some embodiments, the DFP device 106 may not always discard the subsequent PING packet, but may instead periodically attempt to resend the PING packet to the first USB endpoint to detect a reconnection of the USB device 108. For example, the DFP device 106 may wait a predetermined number of PING packets, such as a value in a range from 20 to 30 PING packets like 25 PING packets, before attempting to resend the PING packet to the first USB endpoint.

Returning to point 5, it is worth noting that unlike after receiving the original PING packet at point 1, the UFP device 104 refrains from sending a synthetic PING RESPONSE packet to the host device 102 after receiving the subsequent PING packet at point 5, based on the indication stored by the UFP device 104 in response to receiving the notification transmitted by the DFP device 106 at point 4.

This allows the host device 102 to determine how to handle the unresponsive endpoint in accordance with the USB Specifications.

In some embodiments (not illustrated), the host device 102 may eventually transmit a command to the UFP device 104 to remove the first USB endpoint from its endpoint table, at which point the UFP device 104 would remove the first USB endpoint from its endpoint table and transmit a corresponding command to the DFP device 106 to remove the first USB endpoint from its endpoint table. In other embodiments (such as the embodiment illustrated in FIG. 7), the host device 102 may not transmit a removal command, or may wait an undesirably long amount of time before transmitting a removal command. Accordingly, at point 7, the UFP device 104 detects that a timeout period has expired, removes the first USB endpoint from its endpoint table, and generates a synthetic command to the DFP device 106 to remove the first USB endpoint from the endpoint table on the DFP device 106. The DFP device 106 then removes the first USB endpoint from its endpoint table. Though no service interval boundary is illustrated between point 6 and point 7, in some embodiments, one or more service interval boundaries may occur between point 6 and point 7. In some embodiments, the time period between point 6 and point 7 is about 500 ms.

Figure 8:
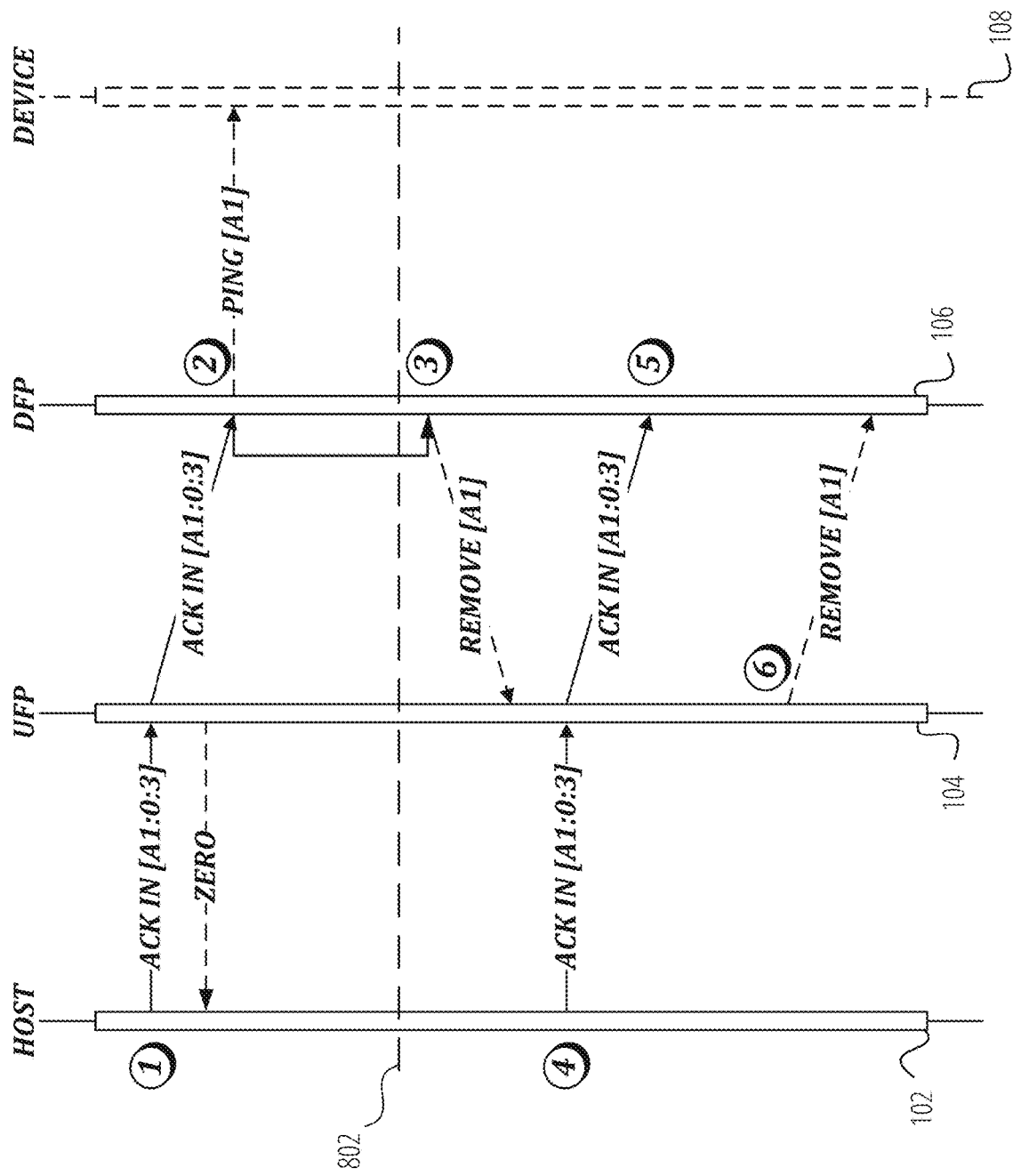
FIG. 8 is a sequence diagram that illustrates another non-limiting example embodiment of a method of processing USB PING packets in an extension environment in which a target USB device has been disconnected, according to various aspects of the present disclosure.

FIG. 8 is a sequence diagram that illustrates another non-limiting example embodiment of a method of processing USB PING packets in an extension environment in which a target USB device 108 has been disconnected, according to various aspects of the present disclosure. As in FIG. 7, the USB device 108 is illustrated in FIG. 8 in dashed line because communication between the DFP device 106 and the USB device 108 fails, either because the USB device 108 has become unresponsive, because the USB device 108 has been disconnected, or for any other reason.

The host device 102 illustrated in FIG. 8 is configured, similar to the host device 102 illustrated in FIG. 6, to transmit a request packet without first transmitting a preliminary PING packet to ensure that the USB device 108 is available. Accordingly, at point 1, the host device 102 generates a request packet addressed to the first USB endpoint and transmits it to the UFP device 104. The UFP device 104 transmits the request packet to the DFP device 106, and because a PING RESPONSE packet has not been received by the UFP device 104, the UFP device 104 transmits a zero-length DATA packet or another type of packet to the host device 102 to cause the host device 102 to enter a waiting state.

Upon receiving the request packet at DFP device 106, the DFP device 106 determines whether a PING packet has previously been sent to the first USB endpoint. The DFP device 106 may check whether a PING packet has ever been sent to the first USB endpoint, or whether a PING packet has been sent to the first USB endpoint within a given previous time period. Upon determining that a PING packet has not been sent to the first USB endpoint, at point 2 the DFP device 106 generates a synthetic PING packet addressed to the first USB endpoint and transmits the synthetic PING packet on the USB bus.

The processing after point 2 in FIG. 8 is similar to the processing after point 3 in FIG. 7. After a service interval boundary 802 is detected (or a threshold number of service interval boundaries, such as three service interval boundaries) without having received a PING RESPONSE packet from the first USB endpoint, at point 3, the DFP device 106 transmits a notification to the UFP device 104 that the first USB endpoint is unresponsive. The DFP device 106 may also record an indication in its own endpoint table that the PING RESPONSE was not received. Upon receiving the notification, the UFP device 104 may also record an indication in its endpoint table that the PING RESPONSE was not received for the first USB endpoint.

At point 4, the host device 102 regenerates a request packet addressed to the first USB endpoint, and transmits the regenerated request packet to the UFP device 104. The UFP device 104 transmits the regenerated request packet to the DFP device 106 without transmitting a zero-length DATA packet (or other packet to cause the host device 102 to wait) to the host device 102. The DFP device 106 receives the regenerated request packet at point 5 and discards it. As described above, in some embodiments, the DFP device 106 may periodically retry the PING packet upon receiving subsequent request packets instead of discarding every subsequent request packet without taking action.

Eventually, the host device 102 may detect that a response to its request packet was not received within time limits defined in the USB Specifications, and may transmit a command to the UFP device 104 to remove the first USB endpoint from its endpoint table. The UFP device 104 may remove the first USB endpoint from its endpoint table and transmit a corresponding command to the DFP device 106 to remove the first USB endpoint from its endpoint table. Alternatively, at point 6, the UFP device 104 may detect that a timeout period has expired since the notification generated at point 3 has been received, remove the first USB endpoint from its endpoint table, and generate a synthetic command to the DFP device 106 to remove the first USB endpoint from the endpoint table on the DFP device 106 in response to the timeout. The DFP device 106 then removes the first USB endpoint from its endpoint table. Though no service interval boundary is illustrated between point 5 and point 6 in some embodiments, one or more service interval boundaries may occur between point 5 and point 6, and a period of time such as about 500 ms may pass between point 5 and point 6.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for communicating USB information via a non-USB extension medium, the system comprising:
   a downstream facing port device (DFP device) configured to:
      receive, via the non-USB extension medium, an incoming request packet addressed to a first USB endpoint provided by a USB device; and
      hold transmission of an outgoing request packet based on the incoming request packet to the USB device in response to determining that a ping response packet has not yet been received from the first USB endpoint;
   wherein the ping response packet is a USB transaction packet having a SubType field set to a PING_RESPONSE value.

2. The system of claim 1, wherein the DFP device is further configured to:
   transmit the outgoing request packet to the first USB endpoint in response to determining that a ping response packet has been received from the first USB endpoint.

3. The system of claim 1, wherein the DFP device is further configured to:

receive, via the non-USB extension medium, an incoming ping packet addressed to the first USB endpoint; and
transmit an outgoing ping packet addressed to the first USB endpoint.

4. The system of claim 1, further comprising an upstream facing port device (UFP device), wherein the UFP device is configured to:
receive, from a host device via a USB-compliant connection, an original ping packet addressed to the first USB endpoint;
transmit, to the DFP device via the non-USB extension medium, a ping packet based on the original ping packet; and
transmit, to the host device, a synthetic ping response packet without having received a responsive ping packet from the DFP device.

5. The system of claim 4, wherein the UFP device is further configured to:
receive, from the host device, a request packet addressed to the first USB endpoint; and
transmit, to the host device, a synthetic zero-length packet in response to determining that no data packets responsive to the request packet are stored by the UFP device.

6. The system of claim 4, wherein the DFP device is further configured to:
transmit, via the non-USB extension medium, a notification that the first USB endpoint is unresponsive in response to determining that a ping response packet has not been received from the first USB endpoint prior to expiration of a waiting period.

7. The system of claim 6, wherein the UFP device is further configured to:
receive, from the DFP device, the notification that the first USB endpoint is unresponsive;
receive, from the host device, a ping packet addressed to the first USB endpoint or a request packet addressed to the first USB endpoint; and
refrain from transmitting a synthetic packet to the host device in response to the ping packet or the request packet.

8. The system of claim 6, wherein the UFP device is further configured to:
transmit, to the DFP device, a command to remove the first USB endpoint from an endpoint table in response to either receiving a command from the host device to remove the first USB endpoint or detecting a timeout.

9. A method for communicating USB information via a non-USB extension medium, the method comprising:
receiving, by a UFP device from a host device over a USB-compliant connection, an original ping packet addressed to a first USB endpoint provided by a USB device;
transmitting, by the UFP device to a DFP device via the non-USB extension medium, a ping packet based on the original ping packet;
transmitting, by the UFP device to the host device, a synthetic ping response packet without having received a responsive ping packet from the DFP device;
receiving, by the UFP device from the DFP device, a notification that the first USB endpoint is unresponsive;
receiving, by the UFP device from the host device, a ping packet addressed to the first USB endpoint or a request packet addressed to the first USB endpoint; and refraining, by the UFP device, from transmitting a synthetic packet to the host device in response to the ping packet or the request packet.

10. The method of claim 9, further comprising:
receiving, by the UFP device from the host device, a request packet addressed to the first USB endpoint; and
transmitting, by the UFP device to the host device, a synthetic zero-length packet in response to determining that no data packets responsive to the request packet are stored by the UFP device.

11. The method of claim 9, further comprising:
transmitting, by the UFP device to the DFP device, a command to remove the first USB endpoint from an endpoint table in response to either receiving a command from the host device to remove the first USB endpoint or detecting a timeout.

12. A method for communicating USB information via a non-USB extension medium, the method comprising:
receiving, by a DFP device from a UFP device via the non-USB extension medium, an incoming request packet addressed to a first USB endpoint provided by a USB device; and
holding, by the DFP device, transmission of an outgoing request packet addressed to the first USB endpoint based on the incoming request packet in response to determining that a ping response packet has not yet been received from the first USB endpoint;
wherein the ping response packet is a USB transaction packet having a SubType field set to a PING_RESPONSE value.

13. The method of claim 12, further comprising:
transmitting, by the DFP device via a USB-compliant connection to the USB device, the outgoing request packet addressed to the first USB endpoint in response to determining that a ping response packet has been received from the first USB endpoint.

14. The method of claim 12, further comprising:
receiving, by the DFP device from the UFP device, an incoming ping packet addressed to the first USB endpoint; and
transmitting, by the DFP device to the USB device, an outgoing ping packet addressed to the first USB endpoint.

15. The method of claim 14, further comprising:
transmitting, to the UFP device, a notification that the first USB endpoint is unresponsive in response to determining that a ping response packet has not been received from the first USB endpoint prior to expiration of a waiting period.

16. The system of claim 1, wherein holding transmission of the outgoing request packet based on the incoming request packet to the USB device includes storing the incoming request packet in a packet queue without transmitting a corresponding packet to the USB device.

17. The method of claim 12, wherein holding transmission of the outgoing request packet based on the incoming request packet to the USB device includes storing the incoming request packet in a packet queue without transmitting a corresponding packet to the USB device.

* * * * *